UNITED STATES PATENT OFFICE.

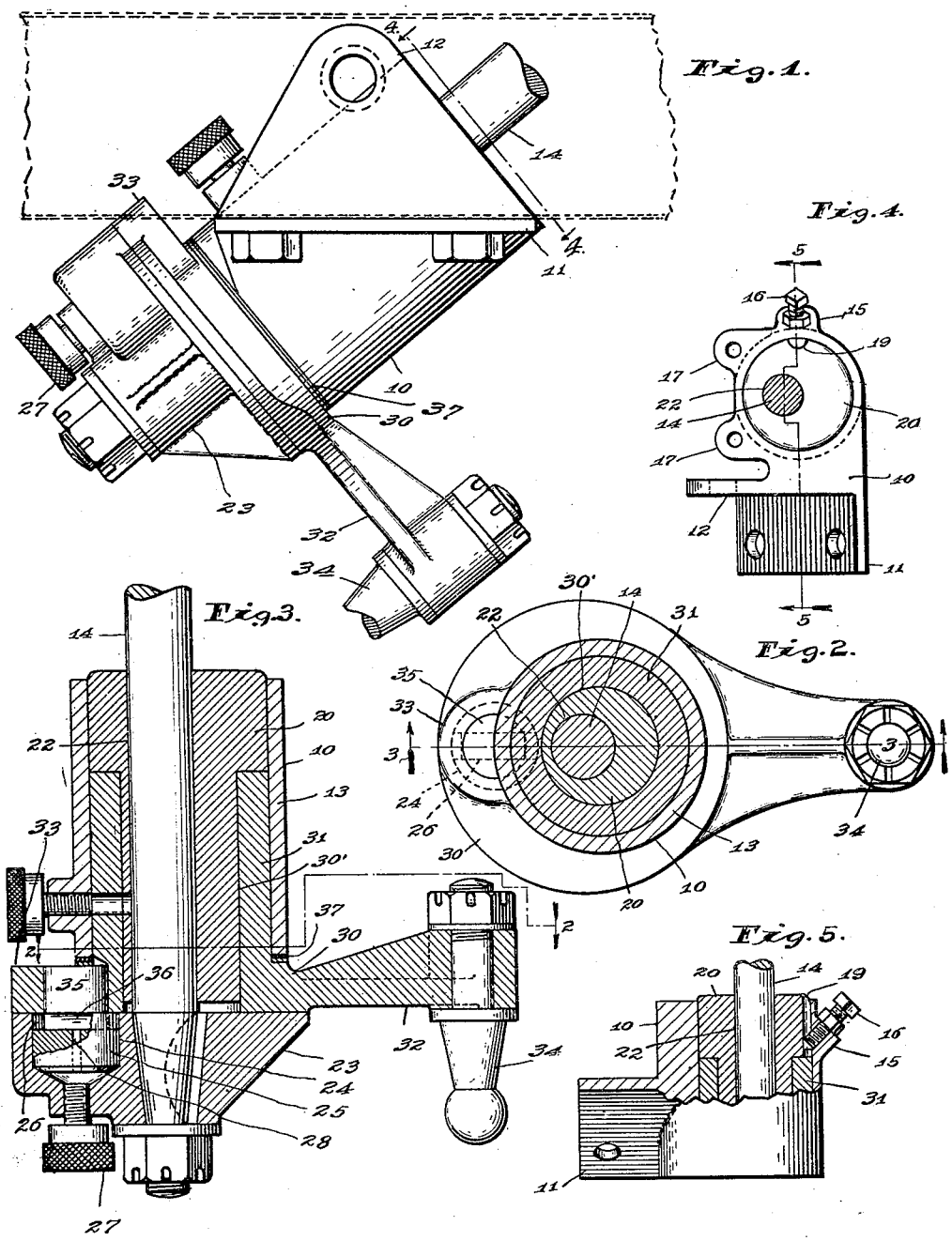

EARL C. BOOTH, OF INDIANAPOLIS, INDIANA, ASSIGNOR TO BOOTH ENGINEERING CORPORATION, OF INDIANAPOLIS, INDIANA, A CORPORATION OF INDIANA.

STEERING-GEAR ATTACHMENT.

1,372,003.

Specification of Letters Patent. Patented Mar. 22, 1921.

Application filed July 6, 1920. Serial No. 394,170.

*To all whom it may concern:*

Be it known that I, EARL C. BOOTH, a citizen of the United States, residing at Indianapolis, in the county of Marion and State of Indiana, have invented a new and useful Steering-Gear Attachment, of which the following is a specification.

It is the object of my invention to provide a steering gear attachment for insertion in the connection between the steering post and the guiding wheels of an automobile, whereby an easier operation of the steering mechanism by the driver's wheel is obtained, but resistance is offered to the transmission of force from the guiding wheels to the driver's wheels, tending to turn the latter, so that the strain on the driver to keep the vehicle in its course is materially lessened.

The accompanying drawing illustrates my invention. Figure 1 is a side elevation of a steering gear attachment embodying my invention; Fig. 2 is a section on the line 2—2 of Fig. 3; Fig. 3 is a section on the line 3—3 of Fig. 2; Fig. 4 is a section, on a somewhat smaller scale, on the line 4—4 of Fig. 1; and Fig. 5 is a section, in partial elevation, on the line 5—5 of Fig. 4.

The steering gear attachment comprises an outer casing 10, having a horizontal flange 11 and a vertical flange 12 for attachment to suitable parts of the vehicle, and a tubular portion 13 extending obliquely upward in the line of the steering post 14 which at the upper end carries the usual driver's wheel (not shown). The upper part of the tubular portion 13 has a lateral oblique boss 15 for receiving an oblique clamping screw 16. The tube 13 may also have any suitable perforated lugs 17, for guiding the usual spark-adjustment and carbureter-adjustment rods associated with the steering post 14.

Mounted within the tubular portion 13 is a bushing 20, having a reduced lower end, the larger upper end of said bushing fitting within the tubular portion 13 and being clamped therein against turning and in any necessary longitudinal position by the clamping screw 16, the end of which is received in a longitudinal slot 19 in the bushing. The bushing 20 has an eccentric longitudinal hole 22 through it, through which extends the steering post or shaft 14. The displacement of the hole 22 is upward from the axis of the tubular part 13, so that steering post 14 extends through the tubular part 13 eccentrically thereof and above the axis thereof. On the tapered lower end of the steering post 14, below the tubular part 13 and spaced therefrom, is fixed a plate 23, provided with an eccentric cylindrical socket 24 offset from the axis of the shaft 14 in the same direction when the parts are in their middle position as the shaft 14 is offset from the axis of the tubular portion 13. The socket 24 is in that face of the plate 23 which is toward the casing 10, and in such socket is rotatably mounted a steel cylinder 25 having a diametrical slot 26 in its face toward the upper end of the socket. A grease cup 27 communicates with the other end of the socket 24, and with a central hole 28 through the cylinder 25, for supplying the necessary lubricant.

Between the plate 23 and the casing 10 is located a plate 30 which has a tubular portion 31 fitting within the lower end of the portion 13 and surrounding the reduced lower end of the bushing 20. Thus if the plate 30 turns it must turn about the axis of the tubular portion 13, and not about the axis of the steering post 14. The plate 30 has a central hole 30' of sufficient size to avoid interference with the steering post 14, which extends eccentrically through such hole. The plate 30 has two diametrically opposite arms 32 and 33, in the first of which is fixed a ball pin 34 for the usual attachment to the steering rod leading to the guiding wheels of the vehicle, and in the second of which is fixed a hardened steel member 35 which has a tongue 36 projecting into the slot 26 of the cylinder 25. The tongue 36 is preferably located on a radius of the tubular portion 31.

In assembling the device, the casing 10 is fastened to the vehicle in proper position, and then the bushing is shifted longitudinally in the casing to any necessary position to make the parts snug and is clamped there by the screw 16. The oblique screw 16 tends to force the bushing 20 downward, so that by adjusting the tightness of such screws the friction between the parts 23 and 30 may be varied. If necessary, suitable shim washers 37 may be located on the tube 31 between the plate 30 and the adjacent end of the casing 13. This longitudinal adjustment is desirable on account of individual differences between cars to which the device may be applied.

In operation, when the steering post 14 is turned by the driver it carries with it the plate 23 and the eccentric cylinder 25. This turning is about the axis of the post 14. Because of the tongue-and-groove connection 26—36 between the cylinder 25 and the member 35, this turning of the plate 23 makes the plate 32 turn also; but the plate 32 turns about the common axis of the tubular casing 13, the bushing 20, and the tubular portion 31, which axis is different from that of the steering post 14. Thus, for movements of the steering post of less than 90° from the position shown, the radius on which the member 35 moves is less than that on which the cylinder 25 moves, and as a result the angular movement of the plate 30 is less than that of the plate 23. In other words, the arm 32 which is connected to the steering rod is moved through a smaller angle than is the steering post 14. In this movement, the cylinder 25 turns in its socket 26, and the tongue 36 slides along the groove 26, as may be necessary. This gives a mechanical advantage to the driver, for the movement of the steering post 14 will be limited to less than 90° on either side of the position, and by reason of the friction of the parts and of this mechanical advantage it prevents turning forces which may be exerted on the driving wheels of the vehicle from being transmitted, at least in their full strength, to the driver's wheel. Thus the strain on the driver in keeping the vehicle in the road is materially lessened.

I claim as my invention:

1. A steering gear attachment, comprising a fixed casing, a plate having a rotatable mounting in such casing and an arm for connection to the steering rod, a driver's steering post extending eccentrically through said casing and plate, a second plate fixed on said steering post and between which and said casing said first plate is located, and a member rotatably and eccentrically mounted in one of said plates, said member and the other plate having a tongue-and-groove connection.

2. A steering gear attachment, comprising a fixed casing, a plate having a rotatable mounting in such casing and an arm for connection to the steering rod, a driver's steering post extending eccentrically through said casing and plate, a second plate fixed on said steering post, and a member rotatably and eccentrically mounted in one of said plates, said member and the other plate having a tongue-and-groove connection.

3. A steering gear attachment, comprising a fixed casing, a plate having a rotatable mounting in such casing and an arm for connection to the steering rod, a driver's steering post extending eccentrically through said casing and plate, a second plate fixed on said steering post, and a member rotatably and eccentrically mounted in one of said plates, said member and the other plate having a tongue-and-groove connection, said tongue and groove extending radially of the other plate from that in which said rotatable member is mounted.

4. A steering gear attachment, comprising a tubular casing having means for suitable attachment to a vehicle, a bushing mounted in said casing and held against turning therein, said bushing and said tubular casing being spaced apart for part of their length to provide an annular space between them, a plate having an annular portion fitting in said annular space, said plate being located at one end of said tubular casing, a steering post mounted eccentrically in said bushing and extending through said plate, a plate fixed on said steering post on the other side of said first plate from that on which said casing is located, one of said plates having an eccentric circular socket formed in its face which is toward the other plate, and a member rotatably mounted in said socket and having a tongue-and-groove connection with the other plate, said first-named plate being provided with an arm for connection with the steering rod.

5. A steering gear attachment, comprising a tubular casing having means for suitable attachment to a vehicle, a bushing mounted in said casing and held against turning therein, said bushing and said tubular casing being spaced apart for part of their length to provide an annular space between them, a plate having an annular portion fitting in said annular space, a steering post mounted eccentrically in said bushing and extending through said plate, a plate fixed on said steering post, one of said plates having an eccentric circular socket formed in its face which is toward the other plate, and a member rotatably mounted in said socket and having a tongue-and-groove connection with the other plate, said first-named plate being provided with an arm for connection with the steering rod.

6. A steering gear attachment, comprising a tubular casing having means for suitable attachment to a vehicle, a bushing mounted in said casing and held against turning therein, said bushing and said tubular casing being spaced apart for part of their length to provide an annular space between them, a plate having an annular portion fitting in said annular space, a steering post mounted eccentrically in said bushing and extending through said plate, a plate fixed on said steering post, one of said plates having an eccentric circular socket formed in its face which is toward the other plate, and a member rotatably mounted in said socket and having a tongue-and-groove connection with the other plate, said first-named plate being provided with an arm for connection with the steering rod, said tongue-and-groove connection extending radially of the plate which it connects to said rotatable member in said socket.

7. A steering gear attachment, comprising a tubular casing having means for suitable attachment to a vehicle, a bushing mounted in said casing and clampable therein in different longitudinal positions thereof, said bushing and said tubular casing being spaced apart for part of their length to provide an annular space between them, a plate having an annular portion fitting in said annular space, a steering post mounted eccentrically in said bushing and extending through said plate, a plate fixed on said steering post, one of said plates having an eccentric circular socket formed in its face which is toward the other plate, and a member rotatably mounted in said socket and having a tongue-and-groove connection with the other plate, said first-named plate being provided with an arm for connection with the steering rod.

8. A steering gear attachment, comprising a tubular casing having means for suitable attachment to a vehicle, a bushing mounted in said casing and held against turning therein, said bushing and said tubular casing being spaced apart for part of their length to provide an annular space between them, a plate having an annular portion fitting in said annular space, a steering post mounted eccentrically in said bushing and extending through said plate, a plate fixed on said steering post, one of said plates having an eccentric circular socket formed in its face which is toward the other plate, and a member rotatably mounted in said socket and having a tongue-and-groove connection with the other plate, said first-named plate being provided with an arm for connection with the steering rod, and said arm being substantially diametrically opposite said tongue-and-groove connection.

9. A steering gear attachment, comprising a tubular casing having means for suitable attachment to a vehicle, a bushing mounted in said casing, a clamping screw oblique to the axis of the casing for clamping the bushing therein, said bushing and said tubular casing being spaced apart for part of their length to provide an annular space between them, a plate having an annular portion fitting in said annular space, a steering post mounted eccentrically in said bushing and extending through said plate, a plate fixed on said steering post, one of said plates having an eccentric circular socket formed in its face which is toward the other plate, and a member rotatably mounted in said socket and having a tongue-and-groove connection with the other plate, said first-named plate being provided with an arm for connection with the steering rod.

In witness whereof I have hereunto set my hand at Indianapolis, Indiana, this second day of July, A. D. one thousand nine hundred and twenty.

EARL C. BOOTH.